United States Patent [19]
Allan et al.

[11] 3,728,008
[45] Apr. 17, 1973

[54] LIQUID CRYSTAL DISPLAY

[75] Inventors: Frank V. Allan, New York, N.Y.;
Paul Y. Hsieh, Ridgewood, N.J.

[73] Assignee: Ing. C. Olivetti and Co., S.p.A., Ivrea, Italy

[22] Filed: Dec. 1, 1971

[21] Appl. No.: 203,884

[52] U.S. Cl..............................350/160 LC, 117/225
[51] Int. Cl.................................................G02f 1/16
[58] Field of Search ................117/215; 350/160 LC

[56] References Cited
UNITED STATES PATENTS

| | | | |
|---|---|---|---|
| 3,597,043 | 8/1971 | Dreyer | 350/149 |
| 3,694,053 | 9/1972 | Kahn | 350/150 |
| 3,700,306 | 10/1972 | Cartwell et al. | 350/150 |

*Primary Examiner*—Edward S. Bauer
*Attorney*—Kevin McMahon

[57] ABSTRACT

A silane derivative is chemisorbed on the interior surfaces of the substrates of a liquid crystal display to eliminate cloudiness of the display and to increase contrast.

9 Claims, No Drawings

LIQUID CRYSTAL DISPLAY

BACKGROUND OF THE INVENTION

Liquid crystal display devices are usually fabricated by sandwiching the liquid crystal material between two substrates having electrodes deposited thereon, at least one of the substrate electrode combinations being transparent. Transparent electrodes may be made of a thin layer of tin oxide, indium, nickel, chromium or aluminum coated on a portion of the surface of a transparent substrate such as glass, and reflective electrodes may be constructed of a polished metal plate or a glass substrate coated with a reflective metallic layer. The thickness of the layer of liquid crystal material in the device is usually between one-quarter mil to about 2 mils.

A problem which has been experienced with liquid crystal devices is that, even when not energized, they appear somewhat cloudy and not highly transparent due to the random orientation of liquid crystal molecules parallel to the surface. This cloudiness is apparent even if the surfaces of the substrate and electrodes have been carefully cleaned.

A better transparency and texture can be obtained by rubbing the surface of the electrode coated substrate in one direction before assembly so that the liquid crystal molecules orient themselves directionally at the surface. This method, however, is both tedious and impossible to control and, furthermore, devices prepared in this way tend to revert to random orientation after a period of time.

A further problem exists in that, when liquid crystal devices, prepared by sandwiching liquid crystal material between clean or directionally oriented electrodes, are heated to the isotropic range of a liquid crystal material and cooled back to the mesophase range, they become spotty in appearance. This is believed to be due to the orientation of liquid crystal domains around the higher energy sites of the surface. Another undesirable phenomenon is the electrolytic deposition of impurities and electrolytic decomposition products of the liquid crystal material on the display electrodes, especially when the device is energized by DC or low frequency AC fields.

It has been suggested in U.S. Pat. No. 3,597,043 to treat the interior faces of the substrates with a lubricating agent, such as lecithin or cationic wetting agents, which physically adhere to the substrate, in order to remove the effects of surface orientation of the liquid crystal material by the substrates. This results in any movement of the substrates, which causes a movement of the liquid crystal layer, producing visible motion patterns in the liquid crystal.

Although the use of these lubricating layers also initially make a liquid crystal display more clear, they soon contaminate the liquid crystal material, especially under the influence of heat, and greatly reduce its life. They, therefore, have not found any commercial application.

SUMMARY OF THE INVENTION

Applicants have overcome these and other problems with known liquid crystal devices by chemisorbing a thin layer of a silane derivative including an alkyl group on the surface of the substrate and the electrodes deposited on a portion thereof, thereby rendering the surface hydrophobic and repellent to the liquid crystal material. The silane derivative is strongly chemically bound to the surface of the substrate and electrodes and does not shorten the life of the liquid crystal material. The alkyl groups form a hydrophobic surface which provides no sites for the liquid crystal material to anchor so that the panels appear completely clean and have a much improved contrast.

DETAILED DESCRIPTION

According to the invention, the substrate and the electrodes deposited on the surface thereof are rendered hydrophobic by chemisorbing a very thin layer of a cationic silane derivative on the surface. The silane derivative may be generally described by the formula $R_nSiX_{4-n}$ where R is an organofunctional group which includes an alkyl and X designates a hydrolyzable group attached to the silicon; for example, an alkoxy group (usually methoxy) or a halogen.

The chemisorbed coating of the silane derivative may be deposited by immersing the electrode coated substrate in a solution of the silane derivative in water or an organic solvent or in a silane derivative vapor. In the case of glass substrates and most electrode materials, the X group reacts with OH groups on the substrate or electrodes eliminating a volatile compound, for instance, an alcohol or HCl, so that the silicon forms a strong chemical bond with the substrate or metal coated thereon, and the alkyl groups, being nonpolar, cause the surface to be hydrophobic. The silane derivatives are also chemisorbed by plastic substrates.

A very important effect of having the exposed surfaces of the substrate and electrodes hydrophobic is a great improvement in contrast. This occurs not only because the unenergized (background) portion of the liquid crystal is much clearer, but also because liquid crystal on the hydrophobic surface forms a close-knit honeycomb domain structure at a voltage slightly above the threshold voltage, instead of the usual sausage-like structure. This honeycomb structure gives much more effective light scattering. At higher voltages, the liquid crystal domains appear to be very small spheres, which give very efficient light scattering.

Some commercially available water-soluble cationic silane derivatives, which have been found to be desirable for use in accordance with the present invention, are marketed as XZ-2-2300 and Z-4141 by Dow Corning Corp. and Siliclad (TRADEMARK), which is sold by Clay Adams Division of Becton, Dickinson and Co. These materials may be used in an aqueous solution in any concentration ranging from about 0.02 percent to about 5 percent, depending on the application. When coating a glass substrate, it is preferred to use solutions having concentrations of between 0.02 percent and 0.5 percent, while the higher concentration solutions are preferred for coating metals. Also useful are Owens Illinois glass resins No. 100 and No. 650 and the chlorosilanes, which are soluble in organic solvents.

The structure of the Dow Corning XZ-2-2300 compound is

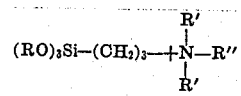

where R and R' are small alkyl groups ($CH_3$ or $C_2H_5$) and R'' is a long alkyl chain ($C_{16}$ to $C_{18}$).

The other materials also all have the general formula $R_nSiX_{4-BVn}$ given above.

The following examples give more detailed descriptions of effective methods of preparing displays according to the invention.

Example 1

Two pieces of Nesa glass (TRADEMARK) are cleaned in a chromic acid solution or a caustic soda solution at pH 8–9 and rinsed thoroughly, first with clean tap water and then distilled water. The cleaned glass is immersed in a 1 percent aqueous solution of Siliclad for about 5 seconds. After complete immersion, they are removed and rinsed thoroughly with distilled water to remove any excess Siliclad from the surface, and the coated surfaces are air dried. The length of immersion time is not critical. A longer immersion may give a thicker layer of the coating; otherwise, there is no detrimental effect on the surface properties.

Air drying is adequate to get a fully cured treatment, but heat is often employed to speed up the curing process. The treated surfaces may be heated to a temperature of 100°C for 10 minutes. Any temperature up to 260°C may be used.

The treated surfaces have a smooth hard film which is hydrophobic and gives a high contact angle with liquid crystal.

The Nesa glass is used to prepare a liquid crystal display panel containing liquid crystal film of 1 mil thickness which is perfectly clear and which has high contrast when energized at 30V DC or AC. The panel shows no spotty appearance after a series of heating and cooling cycles.

Example 2

A clean glass plate on which a reflective layer of aluminum is evaporated by vacuum deposition is immersed in a 5 percent aqueous solution of Siliclad for 10 minutes. After the immersion, the plate is removed and rinsed thoroughly in distilled water to remove any excess Siliclad from the surface. The plate is air dried for 24 hours and fabricated into a display panel by sandwiching liquid crystal between it and a piece of Nesa glass treated as in Example 1 with an electrode spacing of 1 mil.

The panel shows a reflectivity nearly equal to a bare aluminum portion which is not covered by the liquid crystal. The contrast is much higher than a panel which is prepared from an untreated aluminum coated glass plate.

Example 3

A solution of Dow Corning XZ-2-2300 is used in place of the Siliclad in Examples 1 and 2. The quaternary nitrogen atom in the XZ-2-2300 is believed to increase further the strength of the chemisorption of this compound on the surface of the substrate.

This material is supplied in a 50 percent solution in an inert water miscible solvent. It is diluted with distilled water to a concentration in the range of 1 to 0.1 percent. The immersion time is 1 minute or longer. Cells made in this way have the same excellent properties as in the preceding examples.

Example 4

Similar surface treatment may be applied by using a 50 percent solution of dichlorodimethylsilane $(CH_3)_2SiCl_2$ in toluene. The glass, Nesa or metal surface is immersed at room temperature for 5–10 minutes, and then dried at 80°C for 5 minutes. The silane compound interacts with the surface hydroxyl groups, eliminating hydrogen chloride and producing a new hydrophobic surface consisting of inert methyl groups. The cells made in this way have the same optical and electrical properties as in the preceding examples.

Example 5

The surfaces to be treated are exposed to the vapor of dichlorodimethylsilane in a closed vessel for 5 minutes. As before, a surface layer is formed and the material becomes hydrophobic. Cells constructed in this manner have the same good properties as in the preceding examples.

Example 6

A 0.1 percent solution of Owens-Illinois glass resin No. 100 or No. 650 in isopropanol was used to coat glass and Nesa surfaces. The surfaces were dried and heated as high as 400°C. A cell, made as before, from this Nesa glass, when examined under crossed polarizers, showed no orientation of the liquid crystal by the surfaces and exhibited dynamic scattering on DC and AC.

Patent application Ser. No. 177,733 filed Sept. 3, 1971, and now abandoned describes the coating of the interior face of at least one of the substrates with a dielectric layer which may be, for instance, silicon monoxide or silicon dioxide. The materials and methods described above can equally well be used to chemisorb a layer of a silane derivative to the insulating layer.

What is claimed is:

1. A liquid crystal display having a layer of liquid crystal material confined between a pair of substrates, said substrates having electrodes deposited thereon, comprising:
   a silane derivative film chemisorbed on the interior surfaces of said substrates for rendering said substrates hydrophobic and repellent to said liquid crystal material.

2. The liquid crystal material of claim 1 in which said silane derivative has the chemical structure $Si-R_n$, where R is an organofunctional group containing an alkyl.

3. A liquid crystal display according to claim 1 further comprising a dielectric layer between said electrode and said hydrophobic film.

4. The liquid crystal display of claim 3 wherein said dielectric layer comprises an oxide of silicon.

5. The method of preparing a liquid crystal display comprising the steps of:
   chemisorbing a film of a silane derivative to a surface of each of a pair of substrates having electrodes deposited over a portion of a surface thereof for rendering said surface hydrophobic; and
   confining a layer of liquid crystal material bebetween said substrates with said chemisorbed films in contact with said liquid crystal material.

6. The method of claim 5 wherein the step of chemisorbing a film of a silane derivative on the surface of said substrates includes the steps of immersing said substrates in an aqueous solution of a silane derivative having the chemical structure $R_nSiX_{4-n}$, where R is an alkyl, and X designates a hydrolyzable group attached to the silane derivative,
washing said substrate with water, and
drying said substrate.

7. The method of claim 5 wherein the step of chemisorbing a silane derivative on the surface of said substrate includes the step of immersing said substrate in the vapor of a silane derivative having the structure $R_nSiX_{4-n}$, where R is an alkyl and X designates a hydrolyzable group with the silicon.

8. The method of claim 5 wherein the step of chemisorbing a film of a silane derivative on the surface of said substrates includes the steps of immersing said substrates in a solution of a silane derivative having the chemical structure $R_nSiX_{4-n}$, where R is an alkyl, and X designates a hydrolyzable group attached to the silane derivative, and
drying said substrates.

9. The method of claim 5 further including the step of depositing a layer of a dielectric material on said substrate, said silane derivative being chemisorbed to the surface of said dielectric layer.

* * * * *